United States Patent
Jang et al.

(10) Patent No.: US 9,422,000 B2
(45) Date of Patent: Aug. 23, 2016

(54) METHOD FOR PROVIDING TORQUE RELIABILITY AND CONTROL APPARATUS

(71) Applicant: MANDO CORPORATION, Pyeongtaek-si (KR)

(72) Inventors: Hyun Seop Jang, Yongin-si (KR); Do Wook Kwon, Yongin-si (KR)

(73) Assignee: MANDO CORPORATION, Pyeongtaek-Si (KR)

( * ) Notice: Subject to any disclaimer, the term of this patent is extended or adjusted under 35 U.S.C. 154(b) by 86 days.

(21) Appl. No.: 14/260,131

(22) Filed: Apr. 23, 2014

(65) Prior Publication Data

US 2014/0324293 A1  Oct. 30, 2014

(30) Foreign Application Priority Data

Apr. 25, 2013  (KR) .................. 10-2013-0045836

(51) Int. Cl.
 *B62D 6/10* (2006.01)
 *B62D 15/02* (2006.01)
 *G01L 25/00* (2006.01)

(52) U.S. Cl.
 CPC ............ *B62D 6/10* (2013.01); *B62D 15/0215* (2013.01); *B62D 15/0235* (2013.01); *G01L 25/003* (2013.01)

(58) Field of Classification Search
 CPC ...... B62D 6/10; B62D 5/046; B62D 5/0466; B62D 5/0463; B62D 5/049; G01L 3/104
 USPC ................ 701/41, 42; 180/443; 324/207.25; 73/862.193
 See application file for complete search history.

(56) References Cited

U.S. PATENT DOCUMENTS

| 6,445,987 B1* | 9/2002 | Kurishige | B62D 5/0466 180/410 |
| 2003/0062890 A1* | 4/2003 | Tokumoto | B62D 6/10 324/207.25 |
| 2008/0035411 A1* | 2/2008 | Yamashita | B62D 5/046 180/443 |
| 2011/0126639 A1* | 6/2011 | Behrens | G01L 3/104 73/862.193 |
| 2013/0261894 A1* | 10/2013 | Kojima | B62D 5/0463 701/41 |
| 2013/0289826 A1* | 10/2013 | Yoshitake | B62D 5/049 701/42 |

FOREIGN PATENT DOCUMENTS

| DE | 10 2008 038 891 | 2/2010 |
| DE | 10 2009 005 836 | 7/2010 |

OTHER PUBLICATIONS

Office Action for German Patent Application No. 10 2014 005 922.7.

* cited by examiner

*Primary Examiner* — Yuri Kan
(74) *Attorney, Agent, or Firm* — Ladas & Parry, LLP

(57) ABSTRACT

The present invention relates a method and a control apparatus for providing torque reliability. In particular, the present invention relates to a method and a control apparatus for providing torque reliability in which it is determined whether a signal output from a torque output element includes an error, and when it is determined that there is an error, a torque can be accurately calculated using steering angle information and motor position information instead of information output from the torque output element.

16 Claims, 5 Drawing Sheets

METHOD FOR PROVIDING TORQUE RELIABILITY AND CONTROL APPARATUS

CROSS-REFERENCE TO RELATED APPLICATION

This application claims priority from and the benefit under 35 U.S.C. §119(a) of Korean Patent Application No. 10-2013-0045836, filed Apr. 25, 2013, which is hereby incorporated by reference for all purposes as if fully set forth herein.

BACKGROUND OF THE INVENTION

1. Field of the Invention

The present invention relates to a method for providing torque reliability and a control apparatus.

2. Description of the Prior Art

As generally known in the art, a steering control refers to a control that generates an auxiliary steering force so as to assist a driver's steering force. For an accurate steering control, nothing is more important than measuring a driver's steering torque accurately.

However, when a situation in which reliability for a torque signal output from a torque sensor is not ensured occurs due to a failure of a torque sensor that measures the driver's steering torque, or the like, steering of a vehicle may be inaccurately controlled or may not be executed, which may cause a serious accident while driving the vehicle.

Despite such a problem, conventional steering control systems do not provide a method of enhancing reliability for a torque signal output from the torque sensor.

SUMMARY OF THE INVENTION

Accordingly, the present invention has been made to solve the above-mentioned problems occurring in the prior art, and an object of the present invention is to provide a method and a control apparatus for providing torque signal reliability.

In order to achieve the above-described object, according to an aspect of the present invention, there is provided a control apparatus including: a signal input unit configured to receive first signals, which are input from two or more torque output elements, respectively, and include at least one of information for an input shaft angle and an output shaft angle and first torque information calculated based on the input shaft angle and output shaft angle, and to receive a second signal which includes steering angle information and motor position information for a motor which are input from a steering angle output element and a motor position output element, respectively; a torque calculation unit configured to calculate a second torque based on the input second signal; an error determination module configured to determine whether an error situation of the two or more torque output elements has occurred or not, based on the first signals input from the two or more torque output elements; and a steering torque determination unit configured to determine a driver's steering torque information based on the first signals or the second torque depending on whether the error situation for the two or more torque output elements has occurred or not.

According to another aspect, there is provided a steering apparatus including: one or more torque output elements configured to sense and output an input shaft angle and an output shaft angle or calculate and output a torque based on the sensed input shaft angle and the sensed output shaft angle; a steering angle output element configured to sense and output a steering angle; a motor position output element configured to sense and output motor position information for a motor; and a control apparatus configured to determine a driver's steering torque based on values output from the one or more torque output elements or determine the driver's steering torque based on the value output from the steering angle output element and the motor position output element, depending on whether values output from the one or more torque output elements include an error, so as to perform a steering control according to the determined steering torque.

According to still another aspect of the present invention, there is provided a method of providing torque reliability by a control apparatus. The method includes: a signal input step in which first signals are received which are input from two or more torque output elements, respectively, and include at least one of information for an input shaft angle and an output shaft angle and first torque information calculated based on the input shaft angle and output shaft angle, and a second signal is received which includes steering angle information and motor position information for a motor which are input from a steering angle output element and a motor position output element, respectively; a torque calculation step in which a second torque is calculated based on the second signal; an error determination step in which it is determined whether an error situation of the two or more torque output elements has occurred or not, based on the first signals input from the two or more torque output elements; and a steering torque determination step in which, when it is determined that an error situation has occurred, a driver's steering torque information is determined based on the first signals or the second signal, depending on whether an error situation has occurred or not in the two or more output elements.

According to the present invention as described above, a method and a control apparatus of providing torque signal reliability are provided in which reliability of a torque related signal output from a torque sensor and, when it is determined that there is a problem, steering angle information and motor position information are used so that the reliability of a torque signal can be ensured.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

The present invention discloses a control device and a method for providing torque reliability.

Hereinbelow, a method and a control apparatus for providing torque according to an exemplary embodiment of the present invention will be described with reference to the accompanying drawings.

Figure 1:
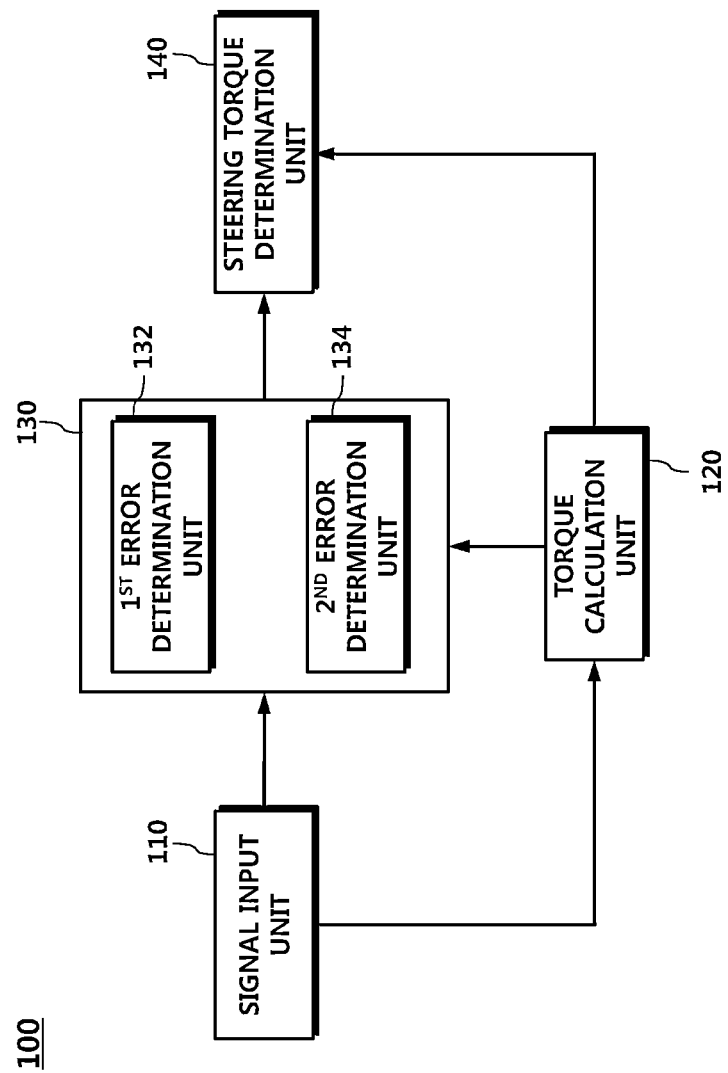
FIG. 1 is a block diagram of a control apparatus according to an exemplary embodiment of the present invention.

FIG. 1 is a block diagram of a control apparatus 100 according to an exemplary embodiment of the present invention.

Referring to FIG. 1, the control apparatus 100 according to an exemplary embodiment of the present invention includes: a signal input unit 110 configured to receive first signals, which are input from two or more torque output elements 210, respectively, and include the first signals including at least one of information for an input shaft angle and an output shaft angle and first torque information calculated based on the input shaft angle and output shaft angle, and to receive a second signal which includes steering angle information and motor position information for a motor which are input from a steering angle output element 220 and a motor position output element 230, respectively; a torque calculation unit 120 configured to calculate a second torque based on the input second signal; an error determination module 130 configured to determine whether an error situation of the two or more torque output elements 210 has occurred or not, based on the first signals input from the two or more torque output elements 210; and a steering torque determination unit 140 configured to determine a driver's steering torque information based on the first signals or the second torque depending on whether the error situation for the two or more torque output elements 210 has occurred or not.

The above-mentioned steering angle information may include information corresponding to the input shaft angle, and the motor position information may include information corresponding to the output shaft angle.

For example, the steering angle information of the first signals may be steering angle information measured by a steering angle sensor which may be the information corresponding to the input shaft angle. In addition, the motor position information may be information corresponding to the output shaft angle measured by a motor position sensor.

Further, for example, the steering apparatus 200 may have a construction in which an output shaft passes through a motor shaft such that the motor position information measured by the motor position sensor may include the information corresponding to the output shaft angle.

The motor position sensor is a sensor configured to detect a position of a plunger of an Idle Speed Control (ISC) servo so as to control the number of revolutions of idling in which the motor position sensor may be incorporated in the ISC servo and detect the position of the plunger so as to send a signal to an Electronic Control Unit (ECU) 300.

The above-described torque calculation unit 120 may calculate the second torque based on a difference between the steering angle information which corresponds to the input shaft angle and the motor position information for the motor which corresponds to the output shaft angle.

For example, the torque calculation unit 120 may deem the steering angle information measured from the steering angle output element 220 as an input shaft angle and the motor position information measured from the motor position output element 230 as the output shaft angle to calculate a difference therebetween, and then determine the second torque based on the calculated difference value.

Referring to FIG. 1, the error determination module 130 according to the exemplary embodiment of the present invention may include the first error determination unit 132 configured to confirm whether a first signal difference value between the input shaft angles, between the output shaft angles, or between the first torques which have been confirmed through the first signals input from the two or more torque output elements 210 is not less than a first reference value and, when it is confirmed that the first signal difference value is not less than the first reference value, to determine that an error situation in which the first signal information input from one of the two or more torque output elements 210 includes an error.

Specifically, for example, the first error determination unit 132 receives an input of first signals through the signal input unit 110, and compares a difference between the input shaft angles or output shaft angles in the first signals which are measured from the two or more torque output elements 210, respectively, with a pre-set first reference value. When the difference is not less than the first reference value, it may be determined that an error situation in which the input shaft angle or output shaft angle information input from one of the two or more torque output elements 210 includes an error has occurred.

In addition, the first error determination unit 132 receives an input of the first signals through the signal input unit 110, and compares a difference between first torques in the first signals which are calculated from the two or more torque output elements 210, respectively, with the pre-set first reference value. When the difference is not less than the first reference value, it may be determined that an error situation in which the input shaft angle or output shaft angle information input from one of the two or more torque output elements 210 includes an error has occurred.

Referring to FIG. 1, when a situation in which it is confirmed that the first signal difference value is not less than the first reference value continues for a predetermined length of time or sensed a pre-set number of times, the error determination module 130 according to the exemplary embodiment of the present invention may finally determine that an error situation of the first signals has occurred.

As an example, when it is determined by the first error determination unit 132 that an error has occurred in the first signals, the error determination module 130 determines whether the error of the first signals has repeatedly occurred for a predetermined length of time or a predetermined number of times in order to confirm whether the error situation has occurred continuously or repeatedly, and when the error situation has occurred repeatedly for a length of time in excess the predetermined length of time or a number of times in excess of the predetermined number of times, it may be finally determined that the error situation has occurred.

Referring to FIG. 1, when it is confirmed by the first error determination unit 132 that the first signal difference value is less than the first reference value, the error determination module 130 according to the exemplary embodiment of the present invention calculates a mean torque value based on the first signals which are input from the two or more torque output elements 210. In addition, the error determination module 130 may include a second error determination unit 134 configured to confirm whether a difference between the mean torque value based on the first signals and the second torque value calculated from the torque calculation unit 120 is not less than a second reference value, and when the mean torque value based on the first signals and the second torque value is not less than the second reference value, to determine that an error situation in which all the first signals have an error has occurred.

Specifically, descriptions will be made with reference to the torque information in the above-mentioned first signals as an example. When it is confirmed by the first error determination unit 132 that the difference between the first torques which are respectively input from the two or more torque output elements 210 is less than the first reference value, the second error determination unit 134 calculates the mean value of the first torques input from the torque output elements 210, compares a difference between the calculated mean value and the second torque calculated by the torque calculation unit 120, and when the difference value between the mean value and the second torque is not less than the second reference value, determines that an error situation in which all of the first torque information includes an error has occurred.

In addition, descriptions will be made with reference to the input shaft angle or output shaft angle information in the first signals as an example. When it is confirmed by the first error determination unit 132 that the difference between the input shaft angles or the output shaft angles which are input from the two or more torque output elements 210, respectively, is less than the first reference value, the second error determination unit 134 may calculate torques based on the mean value of the input shaft angles and the mean value of the output shaft angles which are input from the torque output elements 210, and when a difference between a mean torque value and the second torque is not less than the pre-set second reference value, may determine that an error situation in which both the input shaft angle or output shaft angle information input from the two or more torque output elements 210 include an error has occurred.

The forgoing descriptions made with reference to some information in the first signal are provided merely for an illustrative purpose so as to help understanding of the present invention. The second error determination unit 134 may separately calculate a torque for each torque output element based on the input shaft angles and the output shaft angles input from the two or more torque output element 210 and then obtain a mean value of the calculated torques. Alternatively, the second error determination unit 134 may calculate a mean value of the input shaft angles and a mean value of the output shaft angles input from each of the torque output elements 210 first, then calculate a mean torque value based on the calculated mean input shaft angle and the calculated mean output shaft angle, and then compare the mean torque value with the second torque to determine whether there is an error or not.

Further, the error determination module 130 may not only determine whether there is an error based on each of the input shaft angle and output shaft angle information in the first signals and the first torque information as described above by way of an example, but also determine whether there is an error based on all the information input as the first signals.

As described above, when the error determination module 130 includes the first error determination unit 132 and the second error determination unit 134, it is possible to secure more improved reliability of steering torque signals and to provide the reliability level requested by, for example, the international standards in the automotive sector (e.g., ISO 26262).

For example, the above-mentioned torque output elements 210 may be implemented as a single element. When the torque output elements 210 are implemented as a single element, the error determination module 130 may calculate a torque angle based on a first signal input form the single torque output element 210 using the second error determination unit 134 without the determination by the first error determination unit 132, then calculate a difference value between the calculated torque angle and the second torque, and then compare the calculated difference value with a pre-set second reference value so as to finally determine whether an error situation has occurred or not. In addition, when it is finally determined that there is no error, the torque determination unit 140 may determine the torque based on the first signal as a driver's steering torque.

Referring to FIG. 1, the steering torque determination unit 140 according to the exemplary embodiment of the present invention may determine a mean torque value or a mean first torque value calculated based on the input shaft angles and the output shaft angles as the driver's steering torque, or determine the second torque as the driver's steering torque, depending on whether an error situation has occurred or not.

For example, when the first error determination unit 132 and the second error determination unit 134 finally determine that no error situation in the first signals has occurred, the steering torque determination unit 140 may determine the mean torque value based on the first signals compared with the second torque in terms of a difference by the second error determination unit 134, as the steering torque. When one of the first error determination unit 132 and the second error determination unit 134 determines that an error situation has occurred, the steering torque determination unit 140 may determine the second torque calculated by the torque calculation unit 120 as the driver's steering torque.

Figure 2:
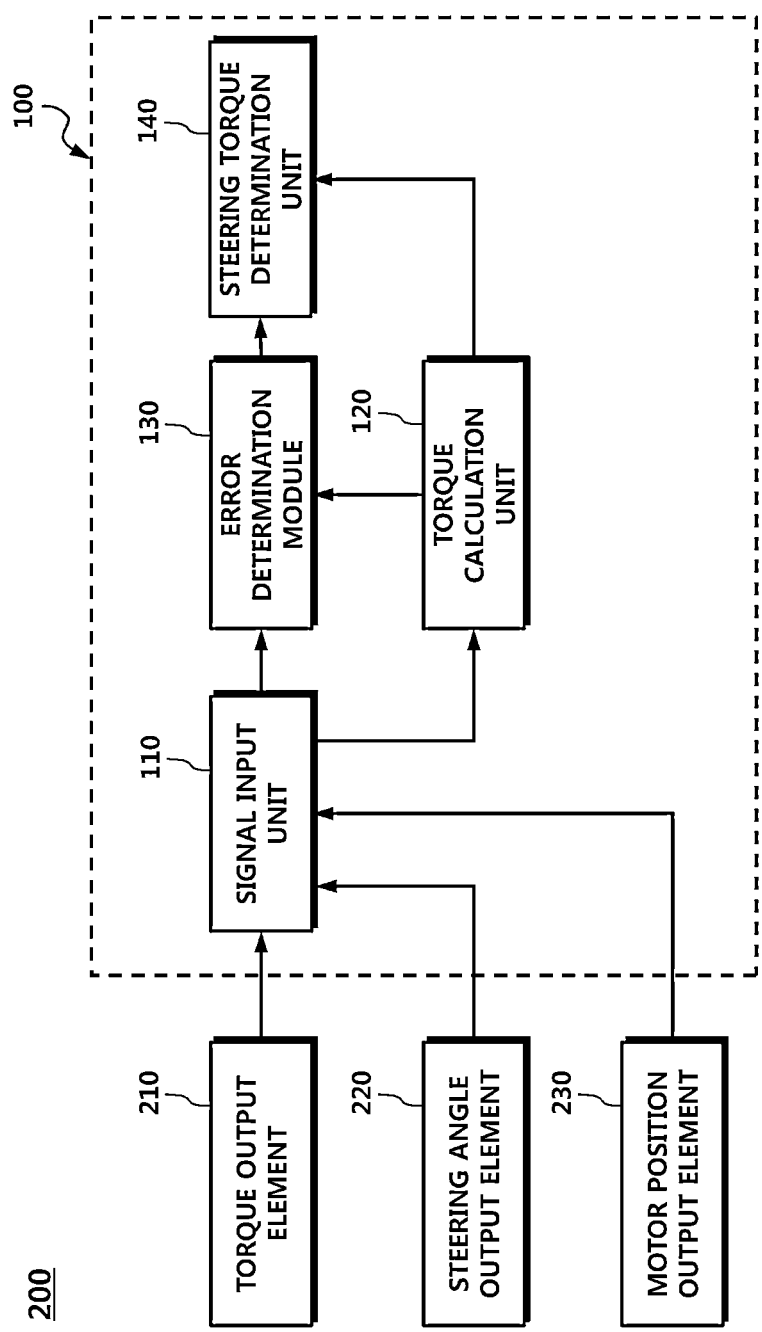
FIG. 2 is a block diagram of a steering apparatus including the control apparatus according to the exemplary embodiment of the present invention.

FIG. 2 is a block diagram of a steering apparatus 200 including the control apparatus 100 according to a second exemplary embodiment of the present invention.

Referring to FIG. 2, the steering apparatus 200 according to another exemplary embodiment may include: one or more torque output elements 210 configured to sense and output an input shaft angle and an output shaft angle or calculate and output a torque based on the sensed input shaft angle and the sensed output shaft angle; a steering angle output element 220 configured to sense and output a steering angle; a motor position output element 230 configured to sense and output motor position information for a motor; and a control apparatus 100 configured to determine a driver's steering torque based on values output from the one or more torque output elements or determine the driver's steering torque based on the value output from the steering angle output element and the motor position output element, depending on whether values output from the one or more torque output elements include an error, so as to perform a steering control according to the determined steering torque.

In addition, referring to FIG. 2, according to the second exemplary embodiment of the present invention, the one or more torque output elements 210 and the steering angle output element 220 or the one or more torque output elements 210 and the motor position output element 230 may be implemented by a single torque angle sensor, or the one or more torque output elements 210 may be implemented by a torque sensor, the steering angle output element 220 may be implemented by the steering angle sensor, and the motor position output element 230 may be implemented by a motor position sensor.

For example, the one or more torque output elements 210 may measure and output the input shaft angle and the output shaft angle, or measure the input shaft angle and the output shaft angle and output a first torque calculated therefrom. In addition, the one or more torque output elements 210 may include all of the input shaft angle, the output shaft angle, and the first torque. The steering angle output element 220 may measure and output the driver's steering angle information and the motor position output element 230 may measure and output the motor position information.

In particular, for example, the torque output element 210 and the steering angle output element 220 may be implemented by a single torque angle sensor, and the torque output element 210 and the motor position output element 230 may also be implemented by a single torque angle sensor so as to apply the first signal and the second signal. Further, the torque output element 210, the steering angle output element 220, and the motor position output element 230 are separately implemented by a torque sensor, a steering angle sensor, and a motor position sensor, respectively, so as to apply the first signal and the second signal to the signal input unit 110.

As an example, the motor position sensor may provide feedback on each position of the motor based positions of a rotator or a stator. In addition, when the output shaft and the motor shaft are positioned on the same axis as in a configuration in which an output shaft passes through a motor shaft to be used as the motor shaft, the motor position sensor may measure and output motor position corresponding to the output shaft angle.

Specifically, the steering apparatus 200 to which the exemplary embodiment of the present invention is applied may be a steering apparatus 200 that supports a steering force through a coaxial axis structure in which a motor 324, a steering shaft (including an input shaft 312, a torsion bar 318, and an output shaft 322), a reducer, etc. are positioned on the same axis.

Such a steering apparatus 200 includes an input shaft 312 and an output shaft 322 which are connected with each other through a torsion bar 318, a motor 324 configured to provide an auxiliary steering force, and a reducer configured to interconnect the motor shaft of the motor 324 and the output shaft 322 and adjust the rotation ratio of the motor shaft and the output shaft. Here, the motor 324 may be configured to have a hollow motor shaft and the reducer may be constituted with, for example, a planetary gear or the like.

In connection with power transmission in such a steering apparatus 200, descriptions will be made on a connection structure of the input shaft 312 configured to input the driver's steering force, the motor 324 configured to provide an auxiliary steering force, the output shaft 322 configured to transmit a steering force obtained by adding the driver's steering force and the auxiliary force. For example, there may be provided a connection structure in which the input shaft 312 passes through the hollow motor shaft of the motor 324 and is connected with the output shaft 322 through the torsion bar 318, and the hollow motor shaft of the motor 324 is connected with the output shaft 322 through the planetary gear.

Figure 3:
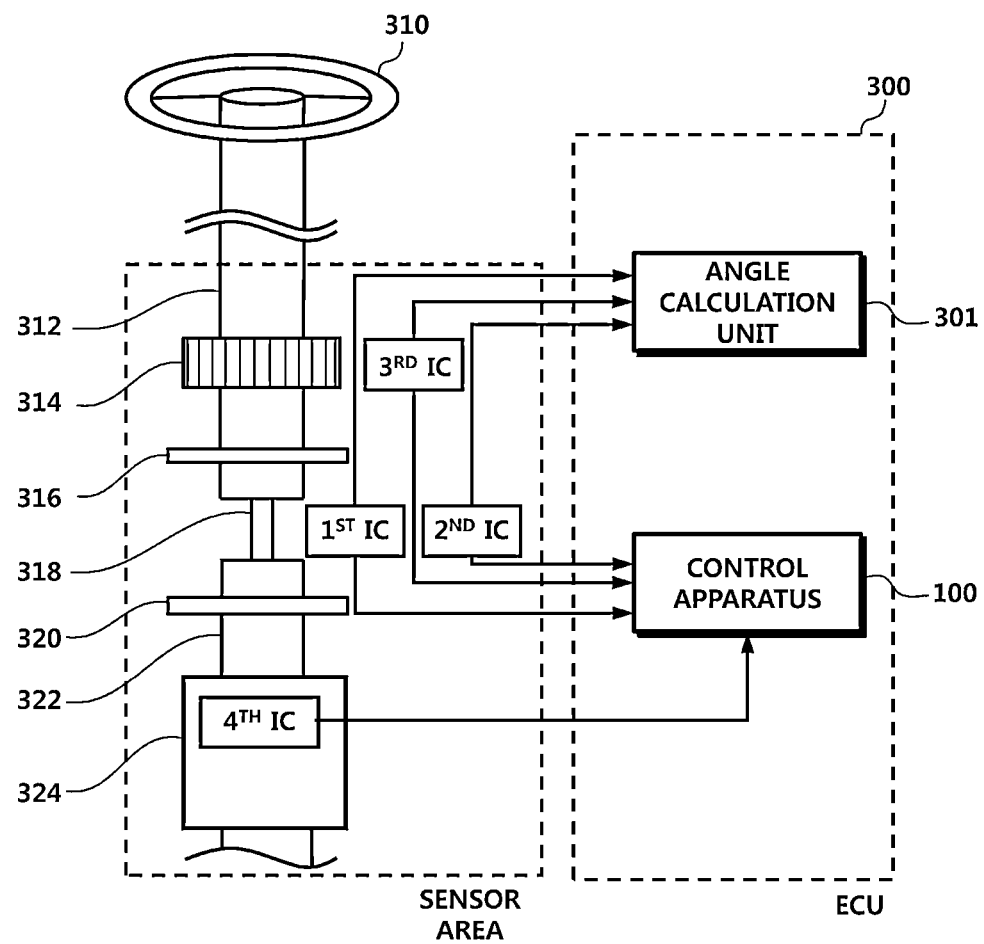
FIG. 3 is a view schematically illustrating a system for the steering apparatus including the control apparatus according to the exemplary embodiment of the present invention.

FIG. 3 is a view schematically illustrating a system for a steering apparatus 200 including the control apparatus 100, according to an exemplary embodiment of the present invention.

Referring to FIG. 3, the steering apparatus 200 according to the exemplary embodiment of the present invention may be a systematic concept that further includes a steering wheel 310, an input shaft 312, a sensing gear 314 configured to detect rotation information, an input shaft rotor angle 316, a torsion bar 318, an output shaft rotor angle, an output shaft 322, and a motor 324, in addition to the torque output element 210, the steering angle output element 220, the motor position output element 230, and the control apparatus 100.

FIG. 3 exemplifies that an ECU 300 is included in the control apparatus 100. In such a case, an angle calculation unit 301 may be further included in the ECU 300. Here, the angle calculation unit 301 may be implemented to be integrated with the control apparatus 100 as a single element.

Referring to FIG. 3, a first Integrated Circuit (IC) and a second IC may be the above mentioned torque output elements 210, a third IC may be the steering angle output element 220, and a fourth IC may be the motor position output element 230.

As described above, either the torque output element 210 and the steering angle output element 220 or the torque output element 210 and the motor position output element 230 may be implemented as a single torque angle sensor or different sensors, respectively.

The above-mentioned ICs may sense an input shaft angle, an output shaft angle, a steering angle, and motor position information, respectively, and send the sensed information to the control apparatus 100 in the ECU 300 and the angle calculation unit 301. In addition, as described above, the first IC and the second IC may calculate a torque based on the measured input shaft angle and output shaft angle and transmit the torque to the control apparatus 100 in the ECU 300 and the angle calculation unit 301.

Hereinafter, a method of providing torque reliability according to an exemplary embodiment of the present invention will be described briefly again with reference to FIGS. 1 to 4.

Figure 4:
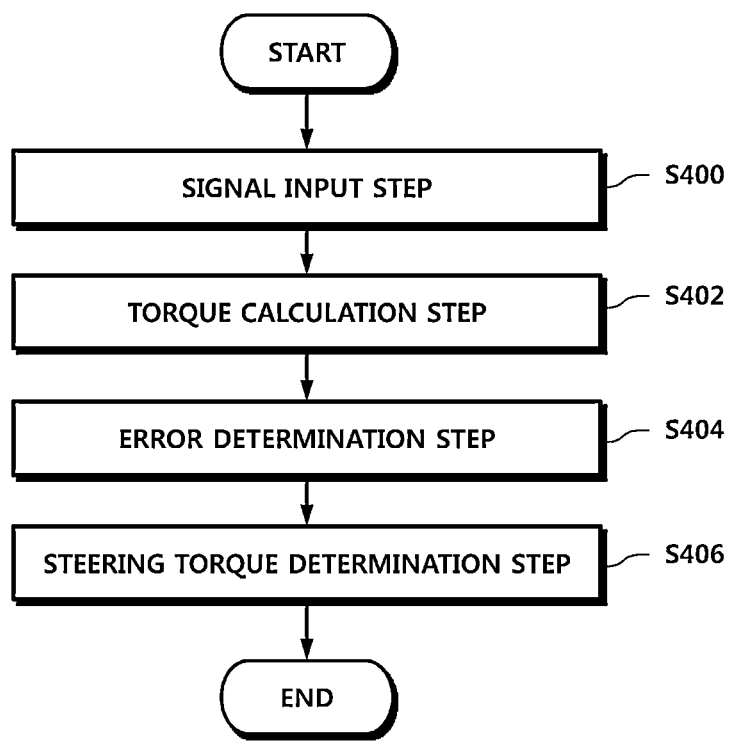
FIG. 4 is a flowchart of a method of providing torque reliability according to an exemplary embodiment of the present invention.

FIG. 4 is a flowchart illustrating a method of providing torque reliability according to a third exemplary embodiment of the present invention.

Referring to FIG. 4, a method of providing torque reliability by the control apparatus 100 according to still another exemplary embodiment of the present invention includes: a signal input step in which first signals are received which are input from two or more torque output elements, respectively, and include at least one of information for an input shaft angle and an output shaft angle and first torque information calculated based on the input shaft angle and output shaft angle, and a second signal is received which includes steering angle information and motor position information for a motor which are input from a steering angle output element and a motor position output element, respectively (S400); a torque calculation step in which a second torque is calculated based on the second signal (S402); an error determination step in which it is determined whether an error situation of the two or more torque output elements has occurred or not, based on the input first signals (S404); and a steering torque determination step in which, when it is determined that an error situation has occurred, a driver's steering torque information is determined based on the first signals or the second signal, depending on whether an error situation has occurred or not in the two or more output elements (S406).

Figure 5:
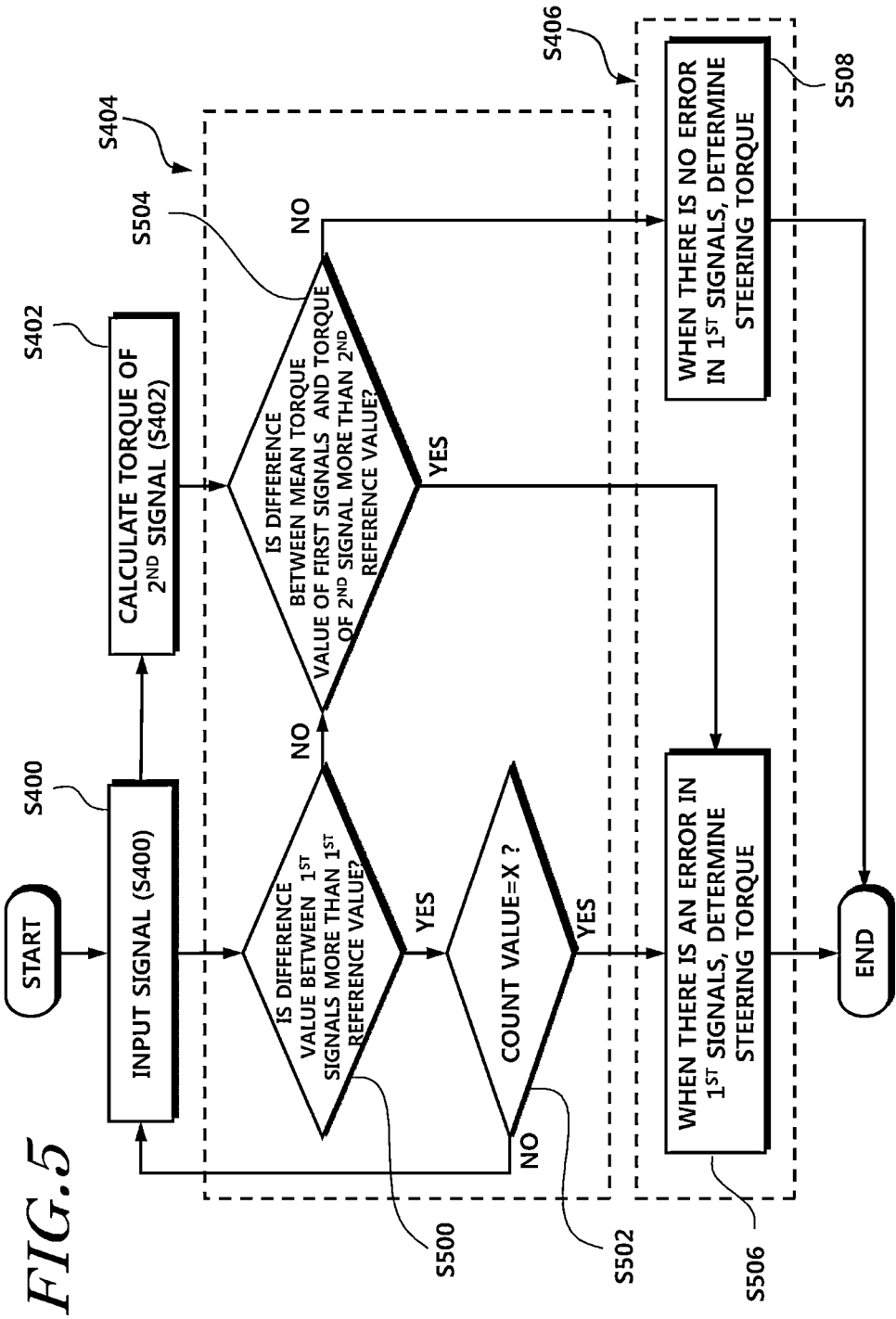
FIG. 5 is a flowchart illustrating, in more detail, an error determination step for determining whether an error situation of a first signal has occurred, in the method of providing torque reliability according to the exemplary embodiment of the present invention.

FIG. 5 is a flowchart illustrating an error determination step (S404) in more detail in which it is determined whether an error situation of a first signal has occurred in the method of providing torque reliability according to the exemplary embodiment of the present invention.

Referring to FIG. 5, the error determination step (S404) according to an exemplary embodiment of the present invention may determine whether a difference value between the first signals input from the two or more torque output elements 210 is not less than a pre-set first reference value (S500), and when the difference value between the first signals is not less than the pre-set first reference value, it is determined that an error situation has occurred and it is confirmed whether the error situation is repeated (S502) so as to finally determine whether the first signals include an error.

In addition, when the above-mentioned difference value between the first signals is less than the pre-set first reference value, it may be determined whether a difference between a mean torque value based on the first signals and a second torque calculated by the torque calculation unit 120 is not less than a pre-set second reference value (S504) so as to determine whether an error situation of the first signals has occurred or not.

For example, when the error situation of the first signals has occurred, the above-mentioned torque determination step (S406) may determine the second torque calculated in the torque calculation step (S402) as a steering torque (S506). When it is determined that no error situation has occurred in the error determination step (S404), the mean torque value based on the first signals may be determined as the steering torque (S508).

As described above, according to the present invention a method and a control apparatus of providing a torque signal reliability are provided in which reliability of a torque-related signal output from a torque sensor is confirmed and, when it is determined that there is a problem, steering angle information and motor position information are used so that the reliability of the torque signal can be ensured.

In addition, according to the present invention, reliability for a torque signal requested by, for example, the international standard of the automotive sector (for example, ISO 26262) can be satisfied.

Further, when the present invention is used, in a structure in which torque sensors are used redundantly so as to secure torque reliability, even if a problem has occurred not only in one torque sensor but also in all the torque output elements, a signal independent from the torque output elements is used so that an accurate steering torque can be calculated.

What is claimed is:

1. A control apparatus comprising:
a signal input unit configured to receive first signals, which are input from two or more torque output elements, the first signals including at least one of information for an input shaft angle and an output shaft angle and first torque information calculated based on the input shaft angle and output shaft angle, and to receive a second signal which includes steering angle information and motor position information for a motor which are input from a steering angle output element and a motor position output element;
a torque calculation unit configured to calculate a second torque based on the ||input|| second signal;
an error determination module configured to determine whether an error situation of the two or more torque output elements has occurred or not based on the first signals input from the two or more torque output elements; and
a steering torque determination unit configured to determine a driver's steering torque information based on the first signals or the second torque depending on whether the error situation has occurred or not in the two or more torque output elements.

2. The control apparatus of claim 1, wherein the steering angle information includes information corresponding to the input shaft angle and the motor position information includes information corresponding to the output shaft angle.

3. The control apparatus of claim 2, wherein the torque calculation unit calculates the second torque based on a difference between the steering angle information corresponding to the input shaft angle and the motor position information for the motor corresponding to the output shaft angle.

4. The control apparatus of claim 1, wherein the error determination module includes a first error determination unit configured to confirm whether a first signal difference value between the input shaft angles, between the output shaft angles, or between first torques which are confirmed through the first signals input from the two or more torque output elements is not less than a first reference value, and, when it is determined that the first signal difference value is not less than the first reference value, to determine that an error situation in which the first signal information input from one of the two or more torque output elements includes an error has occurred.

5. The control apparatus of claim 4, wherein, when the situation in which it is confirmed that the first signal difference value is not less than the first reference value continues for a predetermined length of time or sensed a pre-set number of times, the error determination module finally determines that the error situation of the first signals has occurred.

6. The control apparatus of claim 4, wherein the error determination module includes a second error determination unit, and
wherein, when it is confirmed by the first error determination unit that the difference value between the first signals is less than the first reference value, the second error determination unit confirms whether a difference between the mean torque value based on the first signals and the second torque value calculated from the torque calculation unit is not less than a second reference value, and, when the mean torque value based on the first signals and the second torque value is not less than the second reference value, the second error determination unit determines that an error situation in which all the first signals have an error has occurred.

7. The control apparatus of claim 1, wherein the steering torque determination unit determines a mean torque value or a mean first torque value calculated based on the input shaft angles and the output shaft angles as the driver's steering torque, or determine the second torque as the driver's steering torque, depending on whether an error situation has occurred or not.

8. A steering apparatus comprising:
one or more torque output elements configured to sense and output an input shaft angle and an output shaft angle or calculate and output a torque based on the sensed input shaft angle and the sensed output shaft angle;
a steering angle output element configured to sense and output a steering angle;
a motor position output element configured to sense and output motor position information for a motor; and
a control apparatus configured to determine a driver's steering torque based on values output from the one or more torque output elements or determine the driver's steering torque based on the value output from the steering angle output element and the motor position output element, depending on whether values output from the one or more torque output elements include an error, so as to perform a steering control according to the determined steering torque.

9. The steering apparatus of claim 8, wherein the one or more torque output elements and the steering angle output element or the one or more torque output elements and the motor position output element are implemented by a single torque angle sensor, or the one or more torque output elements is implemented by a torque sensor, the steering angle output element is implemented by the steering angle sensor, and the motor position output element is implemented by a motor position sensor.

10. A method of providing torque reliability by a control apparatus, the method comprising:
   a signal input step in which first signals are received which are input from two or more torque output elements, and include at least one of information for an input shaft angle and an output shaft angle and first torque information calculated based on the input shaft angle and output shaft angle, and a second signal is received which includes steering angle information and motor position information for a motor which are input from a steering angle output element and a motor position output element;
   a torque calculation step in which a second torque is calculated based on the second signal;
   an error determination step in which it is determined whether an error situation of the two or more torque output elements has occurred or not, based on the input first signals; and
   a steering torque determination step in which, when it is determined that an error situation has occurred, a driver's steering torque information is determined based on the first signals or the second signal, depending on whether an error situation has occurred or not in the two or more output elements.

11. The steering apparatus of claim 8, wherein
   first signals include at least one of information for the input shaft angle and the output shaft angle and the torque, and
   the control apparatus includes a first error determination unit configured to confirm whether a first signal difference value between the input shaft angles, between the output shaft angles, or between first torques which are confirmed through the first signals is not less than a first reference value, and, when it is determined that the first signal difference value is not less than the first reference value, to determine that an error situation in which first signal information input from one of the torque output elements includes an error has occurred.

12. The steering apparatus of claim 11, wherein, when the situation in which it is confirmed that the first signal difference value is not less than the first reference value continues for a predetermined length of time or sensed a pre-set number of times, the first error determination module finally determines that the error situation of the first signals has occurred.

13. The steering apparatus of claim 12, wherein the control apparatus includes a second error determination unit, and
   wherein, when it is confirmed by the first error determination unit that the difference value between the first signals is less than the first reference value, the second error determination unit confirms whether a difference between the mean torque value based on the first signals and the second torque value calculated based on the steering angle and the motor position information is not less than a second reference value, and, when the mean torque value based on the first signals and the second torque value is not less than the second reference value, the second error determination unit determines that an error situation in which all the first signals have an error has occurred.

14. The method of claim 10, wherein the error determination step includes a first error determination step comprising confirming whether a first signal difference value between the input shaft angles, between the output shaft angles, or between first torques which are confirmed through the first signals input from the two or more torque output elements is not less than a first reference value, and, when it is determined that the first signal difference value is not less than the first reference value, determining that an error situation in which the first signal information input from one of the two or more torque output elements includes an error has occurred.

15. The method of claim 14, wherein, when the situation in which it is confirmed that the first signal difference value is not less than the first reference value continues for a predetermined length of time or sensed a pre-set number of times, the error determination step finally determines that the error situation of the first signals has occurred.

16. The method of claim 14, wherein the error determination step includes a second error determination step, and
   wherein, when in the first error determination step the difference value between the first signals is less than the first reference value, the second error determination step confirms whether a difference between the mean torque value based on the first signals and the second torque value calculated in the torque calculation step is not less than a second reference value, and, when the mean torque value based on the first signals and the second torque value is not less than the second reference value, the second error determination step determines that an error situation in which all the first signals have an error has occurred.

* * * * *